July 8, 1952 — R. E. MEADE — 2,602,747
MILK PRODUCT PROCESS OF MANUFACTURE
Filed July 19, 1949
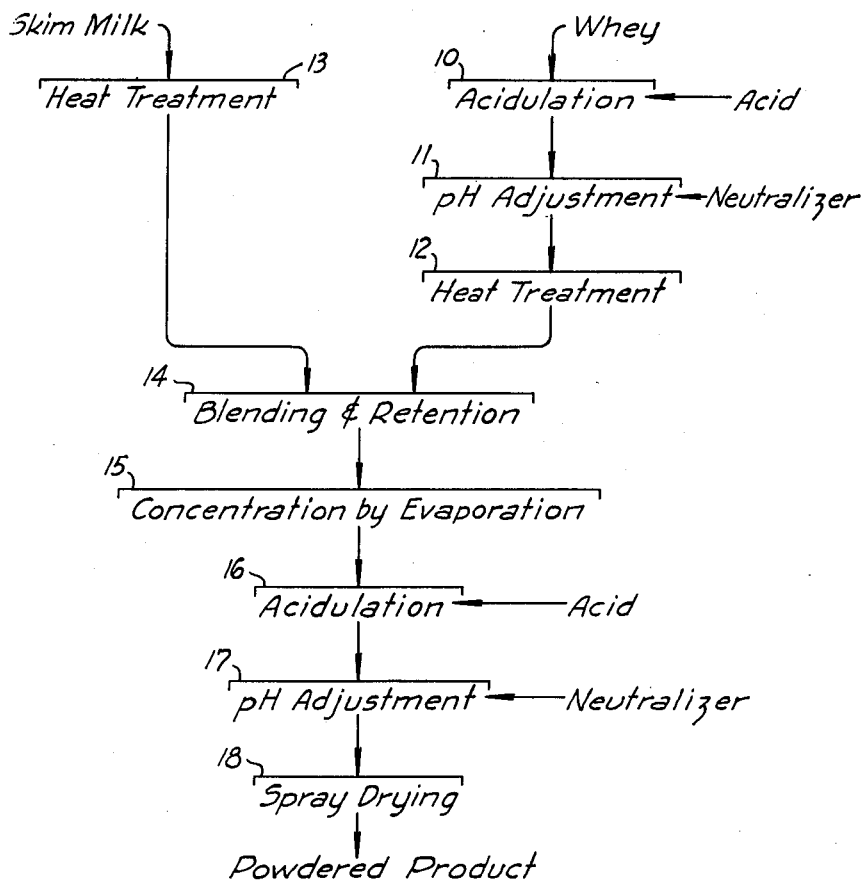
INVENTOR.
Reginald E. Meade
BY
ATTORNEYS Patented July 8, 1952

2,602,747

UNITED STATES PATENT OFFICE 2,602,747

MILK PRODUCT PROCESS OF MANUFACTURE

Reginald E. Meade, Appleton, Wis., assignor to Western Condensing Company, San Francisco, Calif., a corporation of California Application July 19, 1949, Serial No. 105,520

2 Claims. (Cl. 99—56)

This invention relates generally to dried powdered milk products or concentrates such as are suitable for use in bread making, and to processes for their manufacture.

Skim milk powder has become an accepted ingredient in the preparation of bread dough. Various properties of the powder affect its suitability for such use. One characteristic which is particularly important is the ability of the powder to absorb a substantial and predetermined amount of water in forming a dough mix of desired consistency. Good quality conventional skim milk powder such as is now available on the market, and produced by processes involving heat treatment, vacuum evaporation and spray drying, affords a water absorption of substantially 100%. This means that in preparing standard dough mixes including such skim milk powder, an additional amount of water can be added to the mix equal by weight to the weight of the skim milk solids, without detrimentally affecting the plasticity of the dough.

Ordinary commercial wheys such as obtained from the manufacture of casein and in the manufacture of cheese, contain valuable nutrients, including particularly lactose and protein. Commercial whey is available in edible form suitable for human consumption, and it is relatively inexpensive compared to skim milk. However prior to the present invention it has not been successfully used as an ingredient in bread making, due particularly to the fact that when spray dried in the same manner as skim milk, it provides a powder which has relatively poor water absorption.

It is an object of the present invention to provide a process which will produce a product containing solids from both skim milk and whey, and which will have substantially all of the desirable properties of good quality spray dried skim milk in bread making, including a substantially equivalent moisture absorption.

Another object of the invention is to provide a new article of manufacture, namely a powdered milk product having solids derived from skim milk and commercial whey, and which is well adapted for use in bread making.

Additional objects and features of the invention will appear from the following description in which the preferred embodiment has been set forth in detail in conjunction with the accompanying drawing.

Referring to the drawing, the single figure is a flow diagram illustrating one embodiment of the present invention.

The present process involves special conditioning of milk proteins derived from both skim milk and whey, prior to conversion of the material to a dry powder, including particularly the conditioning of all or a substantial part of the lactalbumin present. The special conditioning involves substantially increasing the mineral content together with heat treatment at an elevated temperature. It serves to greatly increase the ability of the final powdered product to absorb moisture, and generally improves the material for use in bread making.

Typical commercial skim milk, such as can be used in the present process, is produced by centrifuging whole milk to remove the majority of the butterfat present. It contains a substantial amount of milk protein, including both casein and lactalbumin. The whey used in the present process can, for example, be fresh edible whey produced from the manufacture of cheddar cheese. Such whey, in addition to its lactose content, contains considerable protein, including lactalbumin.

Referring to the flow sheet of the accompanying drawing, a suitable edible whey is shown being subjected to acidulation at 10, followed by adjustment of the hydrogen ion concentration at 11, and heat treatment at 12. It is desirable to acidulate to provide a hydrogen ion concentration of the order of pH 4.0 to 5.6, and this is preferably carried out by using a suitable inorganic acid, such as a 20% sulphuric acid solution. Hydrochloric acid can be used but it increases the salt (NaCl) content of the material and, therefore, requires an adjustment in the amount of salt employed when preparing a dough mix.

In step 11 the hydrogen ion concentration is adjusted to about pH 6.0 to 9.0, and preferably from about 6.5 to 6.75 by the addition of a suitable neutralizer, such as sodium hydroxide, lime, soda ash, or cream neutralizer (a proprietary product). It will be evident that addition of alkali at this point forms mineral salt by reaction with the free acid present. Heat treatment in step 12 can be over a range of from about 185 to 280° F. If heated to the higher temperatures it is desirable to employ flash heating, as by direct contact with steam, and to then reduce the pressure to atmospheric to cause flash cooling by evaporation to a temperature of the order of 212° F.

The skim milk is heat treated at 13 in the same manner as described above for the whey. The two liquid materials are then mixed or blended together at 14, and are held at an elevated temperature for a substantial period of time before further treatment. Thus assuming that the whey and skim milk fractions are blended together to have a temperature of the order of from 185 to 212° F., the time period of retention can be of the order of thirty minutes. For temperatures substantially above 212° F., it is desirable that the time period of retention be reduced. Thus for 240° F. the time period can be about four minutes, and for 280° F. about 2.5 minutes.

After blending and retention at 14, the material is subjected to concentration by evaporation at 15, to produce a concentrate which may contain for example from 20 to 40% solids. This concentrate is then subjected to acidulation at 16, followed by neutralization at 17. Acidulation at 16 can be carried out in the same manner as the step 10, that is by use of such inorganic acids as sulphuric and hydrochloric, introduced in the form of a dilute solution. Sufficient acid should be added to provide a hydrogen ion concentration of from pH 4.0 to 5.6.

After acidulation at 16 the material is adjusted with respect to its hydrogen ion concentration, by introduction of a suitable neutralizer, as indicated by step 17. This step can be carried out in substantially the same manner as the step 11. Thus neutralizing agents such as sodium hydroxide, lime, soda ash or cream neutralizer can be used for this purpose. Following neutralizing at 17 the material is spray dried at 18, to produce the final powdered product.

The characteristics of the final product will depend upon certain variations in the process, such as the degree of acidulation, the extent of neutralization, the temperature and time period of heat treatment, and the proportions employed between the skim milk and whey.

In one typical instance which can be cited by way of example, edible whey was acidulated by addition of 20% sulphuric acid solution to pH 4.5, and was then neutralized by the addition of milk of lime to pH 6.5. This material was then heated to 185° F. and blended with skim milk which had previously been heated to the same temperature. The blended material was then held at a temperature of 185° F. for a period of thirty minutes. The material was then concentrated by evaporation to about 10° Baumé (corresponding to about 20% solids) after which it was again acidulated at 16, and neutralized at 17. Acidulation at 16 was by addition of 20% sulphuric acid solution to pH 4.5, and neutralization at 17 was by addition of milk of lime to adjust the hydrogen ion concentration to pH 6.8. The proportions involved between the skim milk and whey were such that 60% of the solids in the final product were derived from skim milk, and the remainder from whey.

The dried powdered product made according to the foregoing example possessed water absorptivity of the order of 100%, or in other words it possessed the same water absorptivity as good quality skim milk powder.

In general the product resulting from my process is particularly well suited for use in bread making. It possesses all of the good properties of present day high quality skim milk powder, together with a higher lactose content and other valuable nutrients derived from whey. Because whey is generally a less expensive raw material than skim milk my product can be made at a lower cost than skim milk powder. When incorporated in a standard bread loaf the product imparts good palatability, flavor, crust color and tenderness, body texture, loaf volume and keeping properties. In addition it has good water absorptivity which can be of the order of high quality skim milk powder used in bread making, as in the foregoing example. It has been determined by laboratory tests that bread containing my product up to the 6% level (i. e. 6% of the weight of flour and in the dough) has greatly enhanced nutritive value, particularly with respect to promoting growth.

Lactalbumin of the product plays an important part in obtaining high absorptivity, although the absorptivity is in part due to other milk proteins present, including casein. The proteins of my product appear to be in peculiar denatured form, due both to the added mineral content, and the recurrent heat treatment, and it is this denaturing which appears to impart good absorptivity to the final product.

It will be evident that my process can be modified in various ways. For example, if desired, a mineral salt such as calcium sulphate, can be used in place of separate additions of acid and neutralizer. However somewhat better results have been noted when the acid is first introduced, followed by the neutralizer. The heat treatment can be applied after acidulation at 10 and before neutralization at 11. However from the standpoint of equipment corrosion it is more advantageous to neutralize before heat treatment. Instead of using separate introductions of acid and neutralizer in the steps 16 and 17, it is again possible to use mineral salts as previously specified. The separate heat treatment steps 12 and 13 can be consolidated, by applying heat treatment after the material from the neutralizing operation 11 has been directly blended with skim milk.

In conjunction with special treatment after concentration by evaporation at 15, it should be noted that the denaturing of the protein present is also effected by heat treatment in conjunction with spray drying at 18. During ordinary spray drying the material is momentarily heated to temperatures of the order of 212° F., and this heating at the time of spray drying can be supplemented by preheating to temperatures of the order of from 180 to 212° F., as the material is supplied to the spray drier.

Acidulation and neutralization together with heat treatment before concentration, followed by similar treatment after concentration, produces the desirable properties of the final product, including the desired absorptivity. Some denaturing takes place with respect to the whey protein in steps 10, 11 and 12, and with respect to both the whey and skim milk protein in the heating step 14. After concentration some further denaturing occurs by virtue of steps 16 and 17, together with heating which occurs in conjunction with spray drying. In this connection I have found that the denaturing treatment is particularly effective when applied to a concentrate, and denaturing treatment applied both before and after concentration enables maximum development of moisture absorptivity in the final product.

This application is a continuation-in-part of my copending application Serial No. 38,086, filed July 10, 1948, for "Milk Product and Process of Manufacture," now abandoned.

I claim:

1. In a process for the manufacture of a dry powdered product having high water absorptivity when used in bread dough, acidulating raw liquid whey to a hydrogen ion concentration of the order of from pH 4.0 to 5.6, neutralizing the acidulated whey to a hydrogen ion concentration of the order of pH 6.0 to 9.0, heating the material to an elevated temperature within the range of from about 185 to 280° F., heating a quantity of skim milk, combining the skim milk with the hot whey and retaining the blend at an elevated temperature within said range for a period of from 30 to 2.5 minutes, concentrating the blended material by evaporation, further acidulating the material to a hydrogen ion concentration of from pH 4.0 to 5.6, neutralizing the acidulated material to a hydrogen ion concentration of the order of pH 6.0 to 9.0, and then drying the material to dry powdered form.

2. In a process for the manufacture of a dried powdered product having high water absorptivity when used in bread dough, treating raw liquid whey by acidulating the same to a hydrogen ion concentration of the order of from pH 4.0 to 5.6, by neutralizing the acidulated whey to a hydrogen ion concentration of the order of pH 6.0 to 9.0 and by heating the material to an elevated temperature within the range of from about 185 to 280° F., combining the treated whey with a quantity of skim milk and retaining the blend at an elevated temperature within said temperature range, for a period of from 30 to 2.5 minutes, concentrating the blended material by evaporation, treating the concentrate by acidulating the same to a hydrogen ion concentration of from pH 4.0 to 5.6 and by neutralizing the acidulated material to a hydrogen ion concentration of the order of pH 6.0 to 9.0, and then drying the material to dry powdered form.

REGINALD E. MEADE.

REFERENCES CITED

The following references are of record in the file of this patent:

UNITED STATES PATENTS

| Number | Name | Date |
| --- | --- | --- |
| 442,593 | Rehnstrom | Dec. 9, 1890 |
| 482,897 | Frederiksen | Sept. 20, 1892 |
| 664,318 | Hall | Dec. 18, 1900 |
| 1,557,181 | Messmer | Oct. 13, 1925 |
| 1,870,270 | Washburn | Aug. 9, 1932 |
| 2,023,014 | Flanigan et al. | Dec. 3, 1935 |
| 2,088,606 | Peebles | Aug. 3, 1937 |
| 2,181,146 | Peebles et al. | Nov. 28, 1939 |